(12) United States Patent
Choi et al.

(10) Patent No.: US 8,737,319 B2
(45) Date of Patent: May 27, 2014

(54) METHOD AND APPARATUS FOR REDUCING MAP OVERHEAD IN A BROADAND WIRELESS COMMUNICATION SYSTEM

(75) Inventors: Seung-Hoon Choi, Suwon-si (KR); Chi-Woo Lim, Suwon-si (KR); Song-Nam Hong, Suwon-si (KR); Sung-Eun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 12/653,474

(22) Filed: Dec. 15, 2009

(65) Prior Publication Data
US 2010/0150096 A1 Jun. 17, 2010

(30) Foreign Application Priority Data

Dec. 15, 2008 (KR) .................. 10-2008-0127405
Apr. 15, 2009 (KR) .................. 10-2009-0032710

(51) Int. Cl.
*H04Q 7/00* (2006.01)

(52) U.S. Cl.
USPC .......................................................... 370/329

(58) Field of Classification Search
None
See application file for complete search history.

(56) References Cited

U.S. PATENT DOCUMENTS

| | | | | |
|---|---|---|---|---|
| 6,532,563 B2* | 3/2003 | Nobelen | ................. | 714/751 |
| 7,133,462 B2* | 11/2006 | Ha et al. | ................. | 375/295 |
| 7,289,574 B2* | 10/2007 | Parolari | ................. | 375/295 |
| 7,385,934 B2* | 6/2008 | Uehara et al. | ................. | 370/252 |
| 7,583,649 B1* | 9/2009 | Bagchi | ................. | 370/338 |
| 7,778,340 B2* | 8/2010 | Zhengang et al. | ............ | 375/260 |
| 7,830,916 B2* | 11/2010 | Qi et al. | ................. | 370/468 |
| 7,889,696 B2* | 2/2011 | Choi et al. | ................. | 370/330 |
| 7,921,348 B2* | 4/2011 | Seidel et al. | ................. | 714/751 |
| 8,059,610 B2* | 11/2011 | Li et al. | ................. | 370/334 |
| 2004/0081248 A1* | 4/2004 | Parolari | ................. | 375/259 |
| 2005/0128976 A1* | 6/2005 | Uehara et al. | ................. | 370/329 |
| 2007/0113138 A1* | 5/2007 | Kwon et al. | ................. | 714/748 |
| 2007/0161364 A1* | 7/2007 | Surineni et al. | ............ | 455/343.4 |
| 2007/0259672 A1* | 11/2007 | Heo et al. | ................. | 455/452.2 |
| 2007/0280168 A1* | 12/2007 | Shibata | ................. | 370/331 |
| 2008/0082890 A1* | 4/2008 | Choi et al. | ................. | 714/748 |
| 2008/0095071 A1* | 4/2008 | Lu et al. | ................. | 370/254 |
| 2008/0219219 A1* | 9/2008 | Sartori et al. | ................. | 370/335 |
| 2009/0049356 A1* | 2/2009 | Lin | ................. | 714/749 |
| 2009/0067528 A1* | 3/2009 | Loh et al. | ................. | 375/267 |
| 2009/0147688 A1* | 6/2009 | Matsumoto et al. | .......... | 370/242 |
| 2009/0168711 A1* | 7/2009 | Fukuoka et al. | ............. | 370/329 |
| 2009/0197608 A1* | 8/2009 | Chin et al. | ................. | 455/446 |
| 2009/0303918 A1* | 12/2009 | Ma et al. | ................. | 370/315 |
| 2009/0307552 A1* | 12/2009 | Harada et al. | ................. | 714/748 |
| 2009/0310715 A1* | 12/2009 | Cairns et al. | ................. | 375/320 |
| 2010/0005358 A1* | 1/2010 | Lim et al. | ................. | 714/749 |
| 2010/0014478 A1* | 1/2010 | Futagi et al. | ................. | 370/329 |
| 2010/0023830 A1* | 1/2010 | Wengerter et al. | ............ | 714/748 |
| 2010/0061473 A1* | 3/2010 | Choi et al. | ................. | 375/260 |
| 2010/0080176 A1* | 4/2010 | Maas et al. | ................. | 370/329 |
| 2010/0091902 A1* | 4/2010 | Park et al. | ................. | 375/295 |

(Continued)

*Primary Examiner* — Hassan Phillips
*Assistant Examiner* — Prenell Jones (57) ABSTRACT

A Base Station (BS) includes an apparatus is configured to reduce a MAP overhead in a broadband wireless communication system. The BS operation method for reducing an overhead in a broadband wireless communication system includes transmitting control information for initial transmission and changing first information among the control information transmitted at the initial transmission into second information needed at a retransmission time when there is a retransmission request for the initial transmission. The BS also transmits control information for retransmission including the second information.

30 Claims, 9 Drawing Sheets

(56) References Cited

U.S. PATENT DOCUMENTS

| | | | |
|---|---|---|---|
| 2010/0115358 A1* | 5/2010 | Kotecha et al. | 714/748 |
| 2010/0128650 A1* | 5/2010 | Morimoto et al. | 370/312 |
| 2010/0195594 A1* | 8/2010 | Seo et al. | 370/329 |
| 2010/0220683 A1* | 9/2010 | Novak et al. | 370/330 |
| 2012/0066396 A1* | 3/2012 | Kang et al. | 709/226 |
| 2013/0036338 A1* | 2/2013 | Kotecha et al. | 714/748 |
| 2013/0128780 A1* | 5/2013 | Terry et al. | 370/280 |

* cited by examiner

| MTI = 1 | | |
|---|---|---|
| MCS INDEX | MODULATION ORDER | SE |
| 0 | 2 | 0.08 |
| 1 | 2 | 0.17 |
| 2 | 2 | 0.33 |
| 3 | 2 | 0.67 |
| 4 | 2 | 1 |
| 5 | 2 | 1.33 |
| 6 | 2 | 1.5 |
| 7 | 4 | 2 |
| 8 | 4 | 2.5 |
| 9 | 4 | 3 |
| 10 | 6 | 3.56 |
| 11 | 6 | 4 |
| 12 | 6 | 4.5 |
| 13 | 6 | 5 |
| 14 | 6 | 5.5 |
| 15 | 6 | 6 |

| MTI = 0 | | |
|---|---|---|
| MCS INDEX | MODULATION ORDER | SPID |
| 0 | 2 | 0 |
| 1 | 2 | 1 |
| 2 | 2 | 2 |
| 3 | 2 | 3 |
| 4 | 4 | 0 |
| 5 | 4 | 1 |
| 6 | 4 | 2 |
| 7 | 4 | 3 |
| 8 | 6 | 0 |
| 9 | 6 | 1 |
| 10 | 6 | 2 |
| 11 | 6 | 3 |
| 12 | | RESERVED |
| 13 | | RESERVED |
| 14 | | RESERVED |
| 15 | | RESERVED |

FIG.4

| MCS INDEX | MODULATION ORDER | SE | SPID |
|---|---|---|---|
| 0 | 2 | 0.08 | |
| 1 | 2 | 0.17 | |
| 2 | 2 | 0.33 | |
| 3 | 2 | 0.67 | |
| 4 | 2 | 1 | |
| 5 | 2 | 1.33 | |
| 6 | 2 | 1.5 | |
| 7 | 4 | 2 | |
| 8 | 4 | 2.5 | |
| 9 | 4 | 3 | |
| 10 | 6 | 3.56 | |
| 11 | 6 | 4 | |
| 12 | 6 | 4.5 | |
| 13 | 6 | 5 | |
| 14 | 6 | 5.5 | |
| 15 | 6 | 6 | |
| 16 | 2 | | 0 |
| 17 | 2 | | 1 |
| 18 | 2 | | 2 |
| 19 | 2 | | 3 |
| 20 | 4 | | 0 |
| 21 | 4 | | 1 |
| 22 | 4 | | 2 |
| 23 | 4 | | 3 |
| 24 | 6 | | 0 |
| 25 | 6 | | 1 |
| 26 | 6 | | 2 |
| 27 | 6 | | 3 |
| 28 | | | RESERVED |
| 29 | | | RESERVED |
| 30 | | | RESERVED |
| 31 | | | RESERVED |

| MCS INDEX | MODULATION ORDER | SE | CoRe VERSION |
|---|---|---|---|
| 0 | 2 | 0.08 | |
| 1 | 2 | 0.17 | |
| 2 | 2 | 0.33 | |
| 3 | 2 | 0.67 | |
| 4 | 2 | 1 | |
| 5 | 2 | 1.33 | |
| 6 | 2 | 1.5 | |
| 7 | 4 | 2 | |
| 8 | 4 | 2.5 | |
| 9 | 4 | 3 | |
| 10 | 6 | 3.56 | |
| 11 | 6 | 4 | |
| 12 | 6 | 4.5 | |
| 13 | 6 | 5 | |
| 14 | 6 | 5.5 | |
| 15 | 6 | 6 | |
| 16 | 2 | | |
| 17 | 4 | | 0 |
| 18 | 4 | | 1 |
| 19 | 4 | | 2 |
| 20 | 4 | | 3 |
| 21 | 6 | | 0 |
| 22 | 6 | | 1 |
| 23 | 6 | | 2 |
| 24 | 6 | | 3 |
| 25 | | | RESERVED |
| 26 | | | RESERVED |
| 27 | | | RESERVED |
| 28 | | | RESERVED |
| 29 | | | RESERVED |
| 30 | | | RESERVED |
| 31 | | | RESERVED |

FIG.7

| MCS INDEX | MTI = 1 MODULATION ORDER | SE |
|---|---|---|
| 0 | 2 | 0.08 |
| 1 | 2 | 0.17 |
| 2 | 2 | 0.33 |
| 3 | 2 | 0.67 |
| 4 | 2 | 1 |
| 5 | 2 | 1.33 |
| 6 | 2 | 1.5 |
| 7 | . | . |
| 8 | . | . |
| 9 | . | . |
| 10 | 4 | 2 |
| 11 | 4 | 2.5 |
| 12 | 4 | 3 |
| 13 | . | . |
| 14 | . | . |
| 15 | . | . |
| 16 | . | . |
| 17 | . | . |
| 18 | . | . |
| 19 | . | . |
| 20 | . | . |
| 21 | . | . |
| 22 | . | . |
| 23 | 6 | 3.56 |
| 24 | 6 | 4 |
| 25 | 6 | 4.5 |
| 26 | 6 | 5 |
| 27 | 6 | 5.5 |
| 28 | . | . |
| 29 | . | . |
| 30 | . | . |
| 31 | . | . |

| MCS INDEX | MTI = 0 MODULATION ORDER | SPID | CoRe |
|---|---|---|---|
| 0 | 2 | 0 | |
| 1 | 2 | 1 | |
| 2 | 2 | 2 | |
| 3 | 2 | 3 | |
| 4 | 4 | 0 | 0 |
| 5 | 4 | 0 | 1 |
| 6 | 4 | 0 | 2 |
| 7 | 4 | 1 | 0 |
| 8 | 4 | 1 | 1 |
| 9 | 4 | 1 | 2 |
| 10 | 4 | 2 | 0 |
| 11 | 4 | 2 | 1 |
| 12 | 4 | 2 | 2 |
| 13 | 4 | 3 | 0 |
| 14 | 4 | 3 | 1 |
| 15 | 4 | 3 | 2 |
| 16 | 6 | 0 | 0 |
| 17 | 6 | 0 | 1 |
| 18 | 6 | 0 | 2 |
| 19 | 6 | 0 | 3 |
| 20 | 6 | 1 | 0 |
| 21 | 6 | 1 | 1 |
| 22 | 6 | 1 | 2 |
| 23 | 6 | 1 | 3 |
| 24 | 6 | 2 | 0 |
| 25 | 6 | 2 | 1 |
| 26 | 6 | 2 | 2 |
| 27 | 6 | 2 | 3 |
| 28 | 6 | 3 | 0 |
| 29 | 6 | 3 | 1 |
| 30 | 6 | 3 | 2 |
| 31 | 6 | 3 | 3 |

FIG.8

| MCS INDEX | MODULATION ORDER | SE |
|---|---|---|
| 0 | 2 | 0.08 |
| 1 | 2 | 0.17 |
| 2 | 2 | 0.33 |
| 3 | 2 | 0.67 |
| 4 | 2 | 1 |
| 5 | 2 | 1.33 |
| 6 | 2 | 1.5 |
| 7 | 4 | 2 |
| 8 | 4 | 2.5 |
| 9 | 4 | 3 |
| 10 | 6 | 3.56 |
| 11 | 6 | 4 |
| 12 | 6 | 4.5 |
| 13 | 6 | 5 |
| 14 | 6 | 5.5 |
| 15 | 6 | 6 |

WHEN MODULATION ORDER IS THE SAME

| MCS INDEX | SPID | CoRe VERSION |
|---|---|---|
| 0 | 0 | 0 |
| 1 | 0 | 1 |
| 2 | 1 | 0 |
| 3 | 1 | 1 |
| 4 | 2 | 0 |
| 5 | 2 | 1 |
| 6 | 3 | 0 |
| 7 | 3 | 1 |

WHEN MODULATION ORDER IS DIFFERENT

| MCS INDEX | MODULATION ORDER | SPID |
|---|---|---|
| 8 | 0 | 0 |
| 9 | 0 | 1 |
| 10 | 0 | 2 |
| 11 | 0 | 3 |
| 12 | 1 | 0 |
| 13 | 1 | 1 |
| 14 | 1 | 2 |
| 15 | 1 | 3 |

FIG.9

METHOD AND APPARATUS FOR REDUCING MAP OVERHEAD IN A BROADAND WIRELESS COMMUNICATION SYSTEM

CROSS-REFERENCE TO RELATED APPLICATION(S) AND CLAIM OF PRIORITY

The present application claims priority under 35 U.S.C. §119 to an application filed in the Korean Intellectual Property Office on Dec. 15, 2008 and assigned Serial No. 10-2008-0127405, and an application filed in the Korean Intellectual Property Office on Apr. 15, 2009 and assigned Serial No. 10-2009-0032710, the contents of which are incorporated herein by reference.

TECHNICAL FIELD OF THE INVENTION

The present invention relates to a method for reducing a MAP overhead in a broadband wireless communication system and more particularly, to a method and apparatus for reducing an overhead by distinguishing information that can be transmitted only at an initial transmission time and information that can be transmitted only at a retransmission time in a Hybrid Automatic Repeat reQuest (HARQ) processor operation in a broadband wireless communication system.

BACKGROUND OF THE INVENTION

In wireless environments such as high-speed multimedia wireless communication services, there is a recent sudden increase of a demand for services needing high-speed data transmission. These services require the guarantee of Quality of Service (QoS) such as high data rate and low transmission delay time. In such high-speed data transmission systems, Inter Symbol Interference (ISI) caused by a multipath of a wireless channel greatly degrades the data rate. To solve this, there has been an active research for an Orthogonal Frequency Division Multiplexing (OFDM) technique of being resistant to frequency selective fading and being capable of canceling the ISI by splitting the whole bandwidth into several subcarriers and simultaneously transmitting data.

Alternatively, to provide multimedia services in the wireless environments requires a technique for correcting an error occurring in the wireless environments. For the sake of this, generally, a receiver makes use of Frame Error Correction (FEC) for error correction and Automatic Request and Response (ARQ) for retransmitting erroneous packets. A Hybrid Automatic Repeat reQuest (HARQ) technique, a combination of these two techniques, is used to obtain the advantages of the two techniques.

The HARQ technique is a technique for, when received packets include errors that cannot be decoded, improving a decoding success rate and enhancing performance by combining, without discarding, the erroneous packets with retransmission packets. The two HARQ types are: HARQ type I and HARQ type II/III. The HARQ type I called Chase Combining (CC) is a scheme in which, at a retransmission time, the same packet is retransmitted and combined. The HARQ type II/III is a scheme in which, at a first transmission time, no redundancy bits or only a very few are added to data packets. If packet transmission fails, redundancy bits increase through repeated transmission of the same packet and then, only the redundancy bits are retransmitted.

A combination of the OFDM technique and the HARQ technique provides great advantages of error correction in high-speed multimedia wireless communication and simultaneously, enables high-speed data transmission.

Presently, in an Institute of Electrical and Electronics Engineers (IEEE)802.16 communication system, when a Base Station (BS) transmits data to a Mobile Station (MS) using a HARQ processor, the MS should acquire information such as a Modulation and Coding Scheme (MCS) index including a modulation order and a Spectral Efficiency (SE) (or called a code rate), a resource size, a New Packet Indicator (NPI), a SubPacket IDentifier (SPID), and a HARQ Channel ID (ACID) so as to decode the data. Thus, the BS transmits the above information to the MS through a HARQ MAP control message.

However, there is a problem that, because the BS always has to map a value of the information to an allocated MAP region and transmit the mapped value whenever there is data to be transmitted to the MS, a MAP overhead is generated.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, one aspect of the present invention is to provide a method and apparatus for reducing a MAP overhead in a broadband wireless communication system.

Another aspect of the present invention is to provide a method and apparatus for reducing a MAP overhead by distinguishing information needed at an initial transmission time and information needed at a retransmission time, generating a table, and acquiring mapped information from the table depending on a transmission type.

A further aspect of the present invention is to provide a method and apparatus for reducing a MAP overhead by mapping information needed at a retransmission time to a Modulation and Coding Scheme (MCS) index in a broadband wireless communication system.

The above aspects are achieved by providing a method and apparatus for reducing a MAP overhead in a broadband wireless communication system.

According to one aspect of the present invention, a Base Station (BS) operation method for reducing an overhead in a broadband wireless communication system is provided. The method includes transmitting control information for initial transmission, changing first information among the control information transmitted at the initial transmission into second information needed at a retransmission time when there is a retransmission request for the initial transmission, and transmitting control information for retransmission including the second information.

According to another aspect of the present invention, a Mobile Station (MS) operation method for reducing an overhead in a broadband wireless communication system is provided. The method includes acquiring control information for initial transmission, requesting retransmission when there is a need for a retransmission request for the initial transmission, and acquiring information for the retransmission. The information includes information that is a change of first information among the control information acquired at the initial transmission into second information needed at a retransmission time.

According to a further aspect of the present invention, an apparatus for reducing an overhead in a broadband wireless communication system is provided. The apparatus includes a Hybrid Automatic Repeat reQuest (HARQ) controller. The HARQ controller transmits control information for initial transmission, changes first information among the control information transmitted at the initial transmission into second information needed at a retransmission time when there is a retransmission request for the initial transmission, and transmits control information for retransmission including the second information.

According to a yet another aspect of the present invention, an apparatus for reducing an overhead in a broadband wireless communication system is provided. The apparatus includes a HARQ controller. The HARQ controller acquires control information for initial transmission, requests retransmission when there is a need for a retransmission request for the initial transmission, and acquires information for the retransmission. The information includes information that is a change of first information among the control information acquired at the initial transmission into second information needed at a retransmission time.

According to a still another aspect of the present invention, a method for reducing an overhead in a broadband wireless communication system is provided. The method includes configuring a first information table for initial transmission and a second information table for retransmission, transmitting a corresponding index in the first information table at the initial transmission time, and transmitting a corresponding index in the second information table at the retransmission time. The corresponding index of the first information table is mapped with at least one or more pieces of control information for initial transmission. The index of the second information table is mapped with control information for retransmission in place of the at least one or more pieces of control information mapped with the corresponding index of the first information table.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

A method and apparatus for reducing a MAP overhead in a broadband wireless communication system according to an exemplary embodiment of the present invention are described below. Particularly, a method and apparatus for reducing a MAP overhead in a Hybrid Automatic Repeat reQuest (HARQ) processor operation in an Institute of Electrical and Electronics Engineers (IEEE) 802.16 communication system according to an exemplary embodiment of the present invention are described below.

The HARQ scheme is a method for, when an MS fails to decode at initial transmission, combining packets received at the initial transmission with packets received through retransmission, thus enhancing a decoding success.

Map information transmitted at initial transmission and retransmission includes information such as a Modulation and Coding Scheme (MCS) index, a resource size, an ARQ Identifier Sequence Number (AI_SN), a SubPacket IDentifier (SPID), a HARQ Channel ID (ACID), and so forth. The MCS index includes two pieces of information among a modulation order, a Spectral Efficiency (SE), and a code rate. If using two pieces of information, one may be aware of the rest information necessary for demodulation. That is, if having knowledge of any two pieces of information in 'spectral efficiency=modulation order*code rate', one may be aware of the rest information.

An exemplary embodiment of the present invention may reduce an overhead in a HARQ processor operation because, at a retransmission time, a Base Station (BS) does not transmit information that is already acquired by a Mobile Station (MS) at an initial transmission time.

Figure 1:
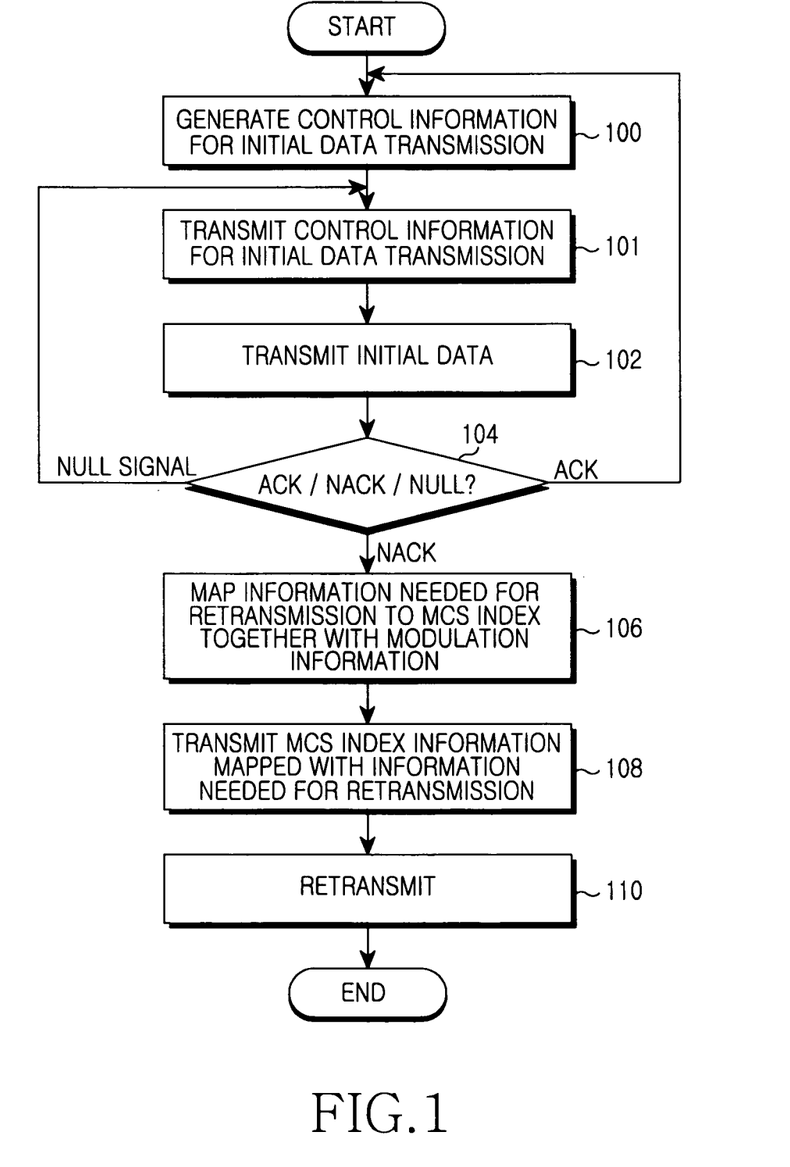
FIG. 1 illustrates an operation of a Base Station (BS) for reducing an overhead at a retransmission time in a broadband wireless communication system according to an exemplary embodiment of the present invention.

FIG. 1 illustrates an operation of a BS for reducing an overhead at a retransmission time in a broadband wireless communication system according to an exemplary embodiment of the present invention.

Referring to FIG. 1, in step 100, the BS generates control information for initial data transmission and, in step 101, transmits the generated control information for initial data transmission.

Then, in step 102, the BS transmits initial data depending on the control information. For example, if using a HARQ processor in an IEEE 802.16 communication system, when transmitting data to an MS, the BS transmits control information including an MCS index mapped with modulation order and SE information to the MS for the MS to decode the data.

Then, when the BS receives an ACKnowledgement (ACK) signal in step 104 (i.e., when the MS sends a request for new packet transmission), the BS proceeds to step 100 and generates control information for new data transmission and, in step 101, transmits the generated control information for new data transmission.

If the BS receives a null signal in step 104 (i.e., when the MS fails to receive the control information for initial data transmission), in step 101, the BS transmits the previously generated control information for initial data transmission and, in step 102, retransmits initial data.

This is because, if the MS is not aware of an MCS index for initial data transmission due to a loss of the initial control information, the MS has to inform the BS of the initial control information loss and again receive the initial control information including the MCS index for initial data transmission from the BS. Thus, the MS has to recognize that the BS transmits the initial control information including the MCS index for initial data transmission even at a retransmission time.

Then, when receiving a Negative ACKnowledgement (NACK) signal in step 104 (i.e., when there is a retransmission request for a redundancy bit from the MS), in step 106, the BS maps the control information, which is already acquired by the MS at an initial transmission time, to other information needed only at a retransmission time. In step 108, the BS transmits control information for retransmission. For example, the BS maps information (e.g., an SPID) necessary for retransmission with an MCS index. The MCS index is also called an MCS level or MCS label. That is, the BS generates control information including an MCS index mapped with information (e.g., an SPID and a CoRe) necessary for retransmission using one of MCS levels of FIGS. 4 to 9 below and then, transmits the generated control information to a corresponding MS.

A description using one exemplary embodiment is made below. When transmitting an MCS index included in a MAP, the BS transmits an MCS index from a table that is a definition of information needed only at a retransmission time in place of information (e.g., an SE) necessary for initial transmission, thus being capable of reducing a MAP overhead. Assuming that the MCS index is mapped with a modulation order and an SE, the BS transmits the MCS index to an MS at an initial transmission time point, and the MS may determine a Network export performance (Nep) that is a data size using the MCS index information. For example, assuming that an MCS index of '7' represents information that a modulation order is equal to '4' and an SE is equal to '2', and a resource size is equal to '96', it can be appreciated from Nep=resource size*SE that a Nep is equal to '192'.

Accordingly, because the BS has no reason to transmit SE information for the sake of Nep determination at a retransmission time point at which an MS is already aware of the Nep, the BS may make use of a region allocated for the SE information for the purpose of transmitting other information needed only at a retransmission time point. Alternatively, it is noted that, when assuming adaptive HARQ, channel circumstances, and the like, can change every transmission time point and thus, a modulation order or resource size may vary every transmission time point and has to be transmitted every transmission.

That is, at a retransmission time, the BS maps, together with modulation information, information needed only at the retransmission time in place of SE information to an MCS index. The information needed only at the retransmission time is SPID information, Constellation Rearrangement (CoRe) version information, and the like. Here, the SPID gives a start position of a subpacket for HARQ transmission at the time of transmission. The CoRe version is used to map a region, which keeps Incremental Redundancy (IR) and then changes into Chase Combining (CC), at a bit reliability different from previously used one at the time of HARQ transmission using a high-order modulation scheme such as 16-Quadrature Amplitude Modulation (16QAM) and 64QAM, thus improving performance.

Alternatively, when receiving a null signal in step 104 (i.e., when an MS fails to receive control information for initial data transmission), the BS may transmit initial control information including an MCS index for initial data transmission even at retransmission time point. Accordingly, indicator information (hereinafter, referred to as an "MCS Table Indicator (MTI)") indicating whether to apply an MCS table for initial data transmission or whether to apply an MCS table for retransmission is defined. For example, when transmitting control information in steps 101 and 108, the BS together transmits the MTI indicating if the control information is equal to control information (MTI=1) for initial data transmission or control information (MTI=0) for retransmission.

The MTI is utilized when an MCS index for initial data transmission and an MCS index for retransmission are distinguished in two MCS tables as in FIGS. 4, 6, 8, and 9. The MTI is not required when an MCS index for initial data transmission and an MCS index for retransmission are distinguished in one MCS table as in FIGS. 5 and 7. Accordingly, when the MCS index for initial data transmission and the MCS index for retransmission are isolated in two MCS tables as in FIGS. 4, 6, 8, and 9, the 'MTI=1' indicates the MCS index for initial data transmission, and the 'MTI=0' indicates the MCS index for retransmission.

After that, in step 110, the BS retransmits data depending on the control information.

Then, the BS terminates the procedure according to the exemplary embodiment of the present invention.

Figure 2:
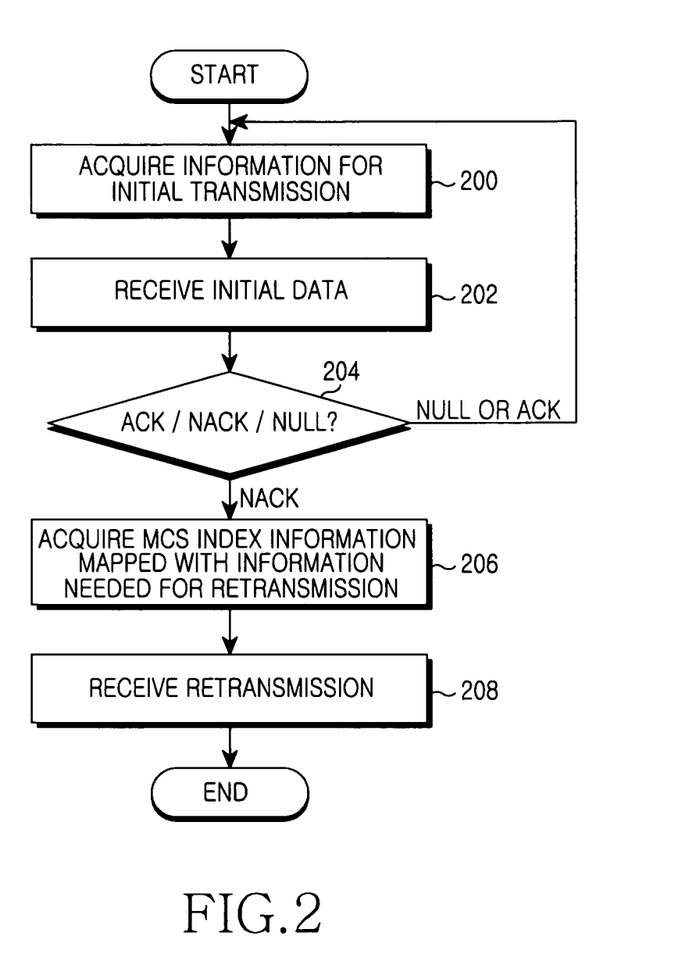
FIG. 2 illustrates an operation of a Mobile Station (MS) for reducing an overhead at a retransmission time in a broadband wireless communication system according to an exemplary embodiment of the present invention.

FIG. 2 illustrates an operation of an MS for reducing an overhead at a retransmission time in a broadband wireless communication system according to an exemplary embodiment of the present invention.

Referring to FIG. 2, in step 200, the MS acquires control information for initial transmission (e.g., an MCS index set as 'MTI=1') and, in step 202, receives initial data.

Then, when failing to successfully decode the received initial data in step 204 (i.e., when there is a retransmission need for a redundancy bit), the MS proceeds to step 206, and transmits a NACK signal and then acquires control information for retransmission (set as 'MTI=0'). For example, the MS acquires an MCS index mapped with information necessary for retransmission. In step 208, the MS receives retransmission data using the control information for retransmission. At this time, because the acquired MCS index is mapped with the control information for retransmission (e.g., an SPID and a CoRe version), and so forth, the MS has to extract corresponding information with reference to corresponding MCS tables shown in FIGS. 4 to 9.

Alternatively, when failing to receive control information for initial data transmission in step 204, the MS transmits a null signal and then again receives control information for initial data transmission. Alternately, when requesting new data, the MS transmits an ACK signal and then receives control information for new data transmission.

Then, the MS terminates the procedure according to the exemplary embodiment of the present invention.

Figure 3:
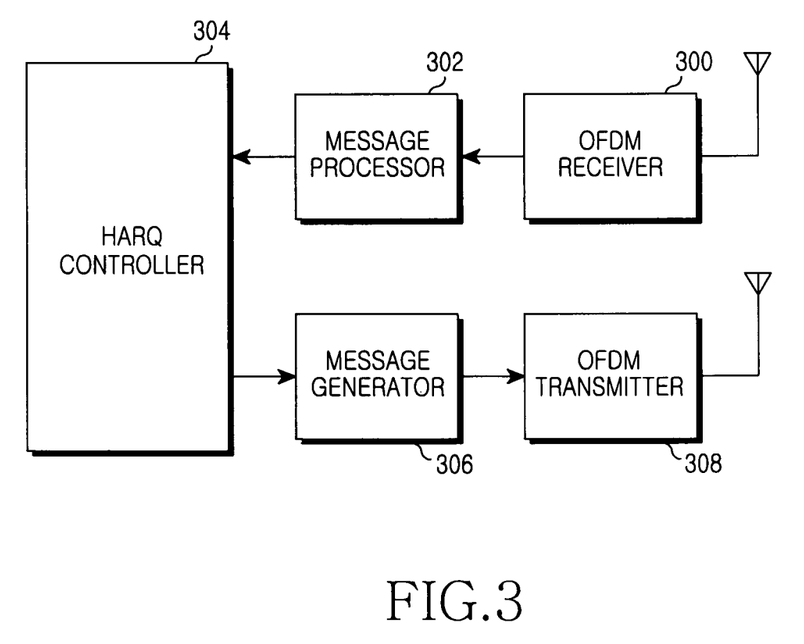
FIG. 3 illustrates a construction of an apparatus for reducing an overhead at a retransmission time in a broadband wireless communication system according to an exemplary embodiment of the present invention.

FIG. 3 illustrates a construction of an apparatus for reducing an overhead at a retransmission time in a broadband wireless communication system according to an exemplary embodiment of the present invention.

Referring to FIG. 3, the apparatus can be included in an MS or BS. The apparatus includes an OFDM receiver 300, a message processor 302, a HARQ controller 304, a message generator 306, and an OFDM transmitter 308.

The OFDM receiver 300 converts a received Radio Frequency (RF) signal into a baseband signal, converts the baseband analog signal into digital sample data, OFDM-demodulates the sample data, and outputs subcarrier values. Here, the OFDM demodulation represents an inclusion of Cyclic Prefix (CP) removal, Fast Fourier Transform (FFT) operation, and so forth. For example, the OFDM receiver 300 receives information such as an MCS index included in a HARQ MAP, a resource size, a New Packet Indicator (NPI), an SPID, and an ACID.

The message processor 302 analyzes a HARQ control message among the demodulated data from the OFDM receiver 300. And, the message processor 302 provides initial transmission and retransmission information (e.g., a modulation order, an SE, a CoRe, and so forth) identified from the HARQ relation control message, to the HARQ controller 304.

The HARQ controller 304 controls a general HARQ processor operation and, for example, maps information (i.e., an SPID, a CoRe, and so forth) necessary for retransmission with an MCS index using the initial transmission and retransmission information from the message processor 302.

As in the exemplary embodiments of FIGS. 1 and 2, in a BS operation, the HARQ controller 304 transmits an MCS index mapped with modulation order and SE information to an MS at an initial transmission time, and transmits an MCS index mapped with a modulation order and information necessary for retransmission to the MS at a retransmission time.

Figure 4:
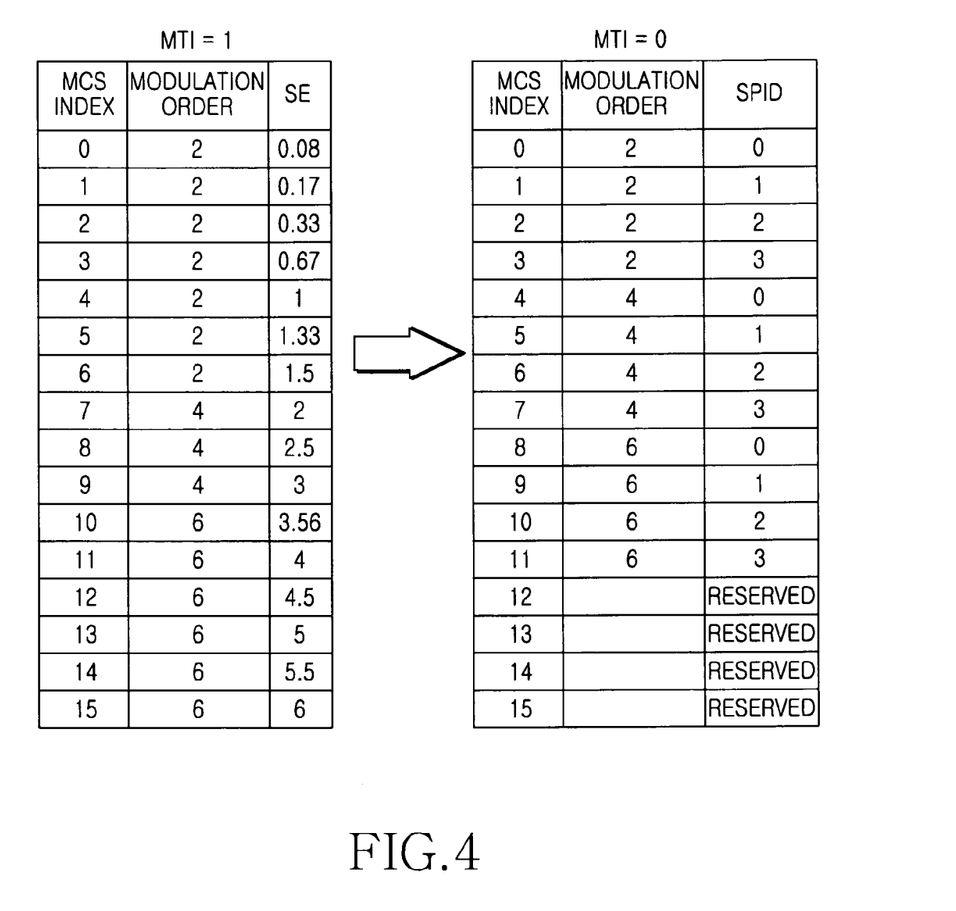
FIG. 4 illustrates a Modulation and Coding Scheme (MCS) table according to a first exemplary embodiment of the present invention.
Figure 5:
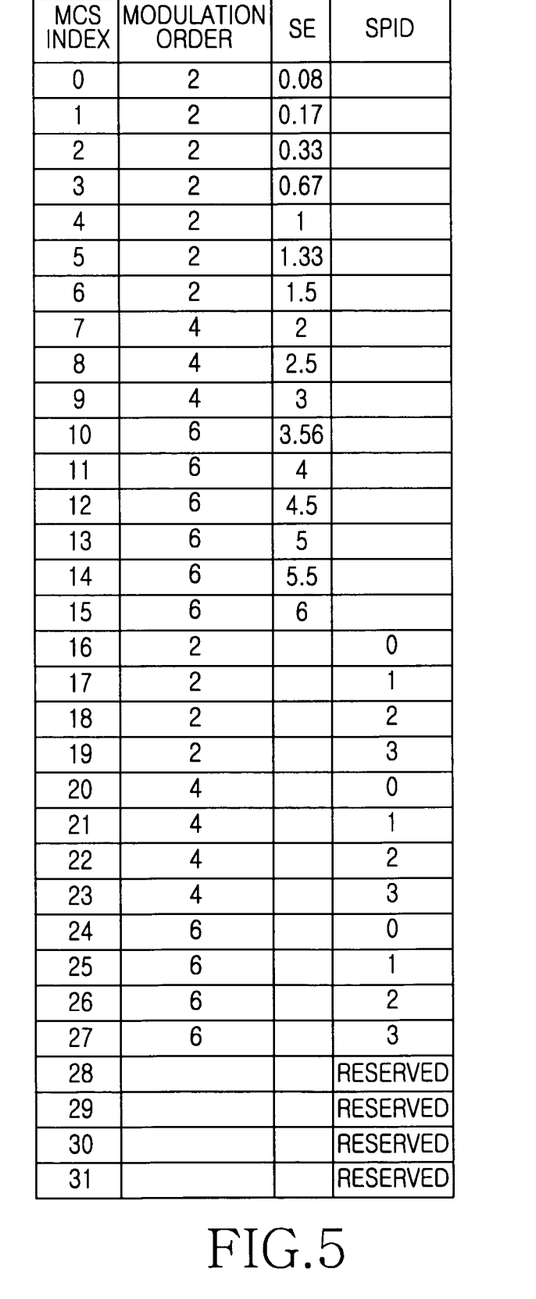
FIG. 5 illustrates an MCS table according to a second exemplary embodiment of the present invention.
Figure 6:
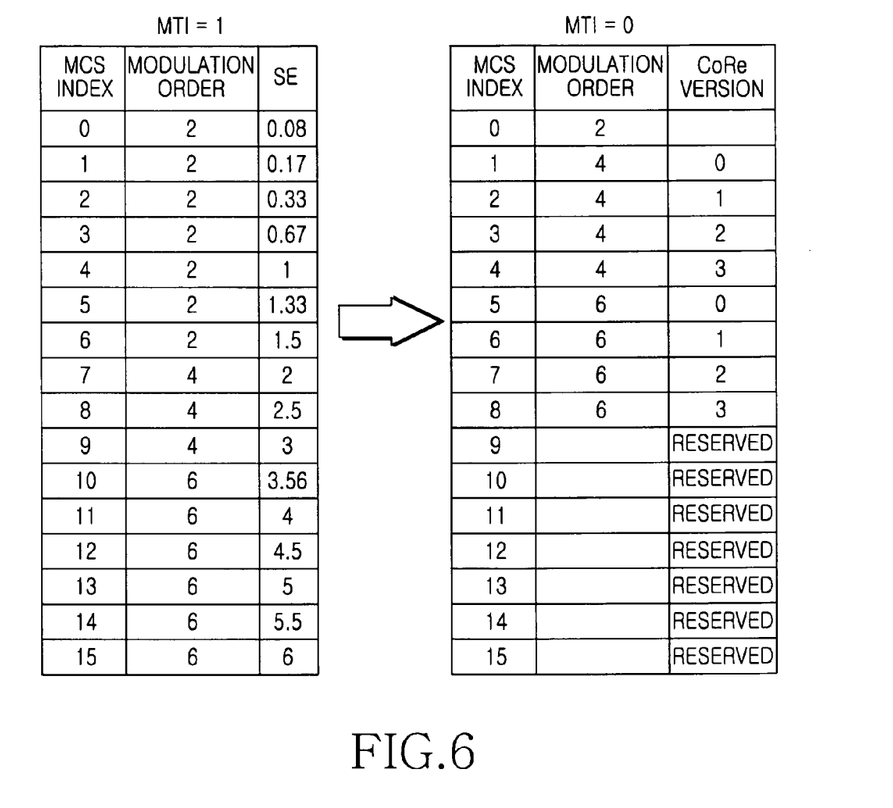
FIG. 6 illustrates an MCS table according to a third exemplary embodiment of the present invention.
Figure 7:
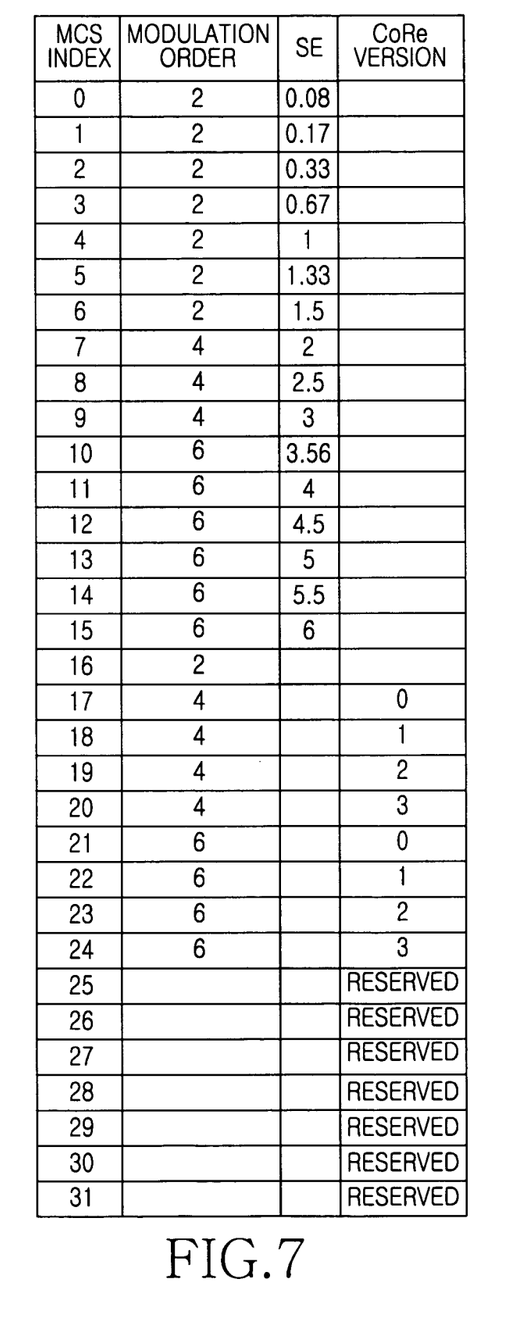
FIG. 7 illustrates an MCS table according to a fourth exemplary embodiment of the present invention.
Figure 8:
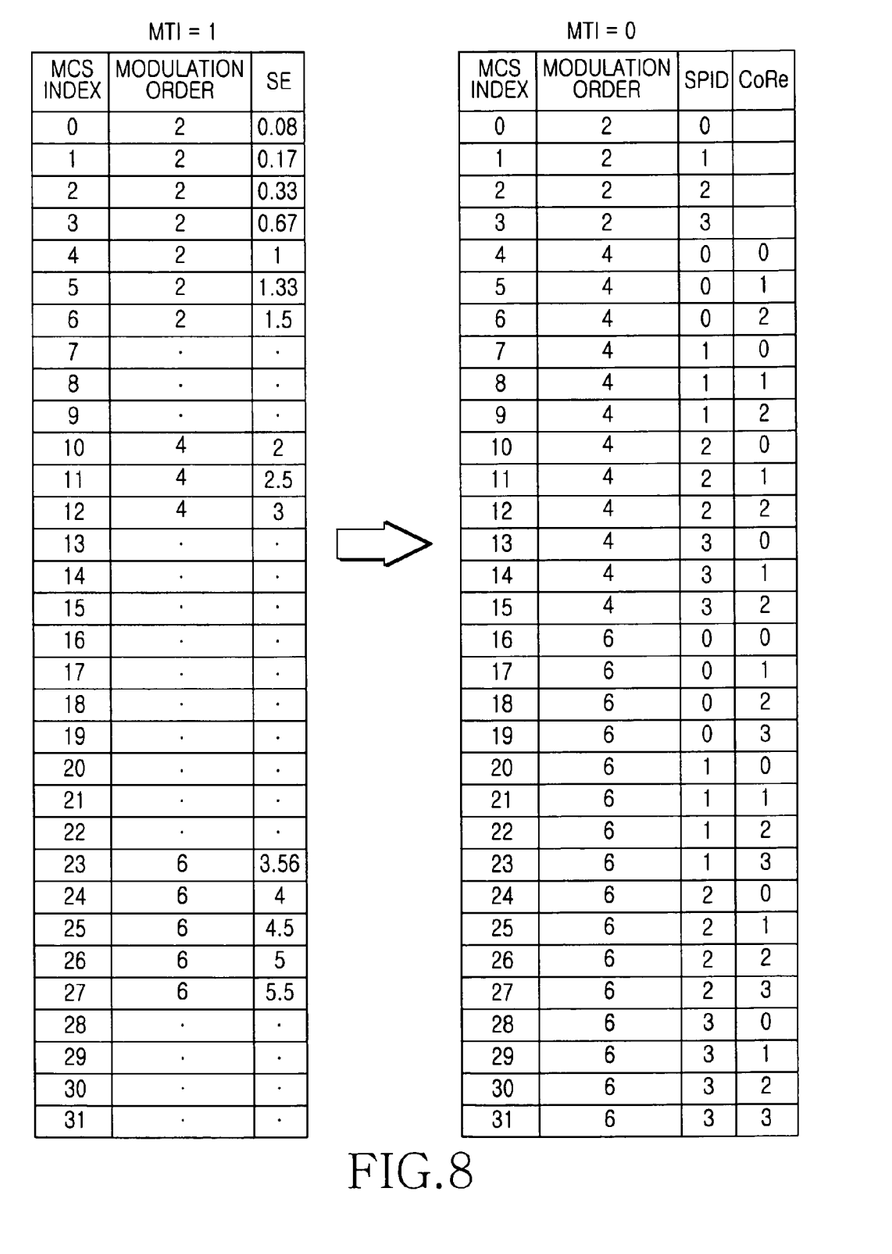
FIG. 8 illustrates an MCS table according to a fifth exemplary embodiment of the present invention.
Figure 9:
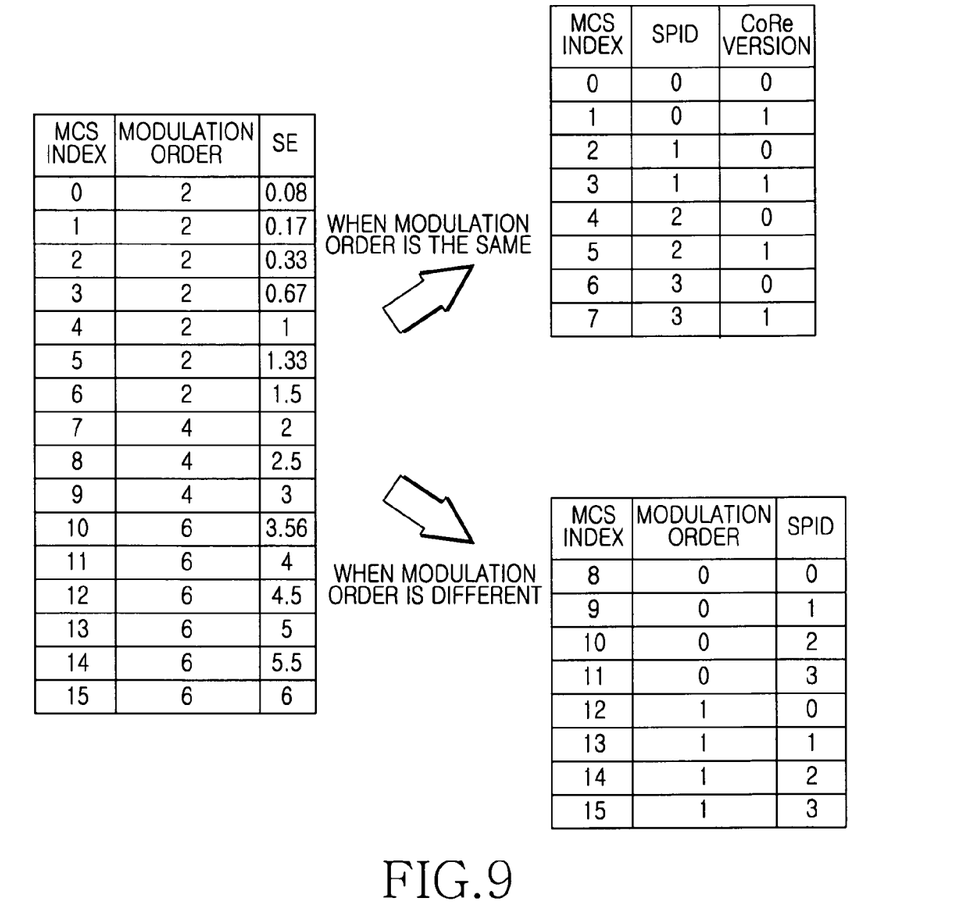
FIG. 9 illustrates an MCS table according to a sixth exemplary embodiment of the present invention.

For example, as shown in FIG. 4 below, the HARQ controller 304 transmits an MCS index mapped with modulation order and SE information at an initial transmission time, and transmits an MCS index mapped with modulation order and SPID information at a retransmission time. At this time, in FIG. 4, MCS tables for initial transmission and retransmission are separately applied using an NPI for distinguishing the initial transmission time and the retransmission time. Unlike this, FIG. 5 below is a case of, without using an NPI for distinguishing an initial transmission time and a retransmission time, applying one MCS table while extending an MCS index to distinguish the initial transmission time and the retransmission time. In FIG. 6 below, the HARQ controller 304 transmits an MCS index mapped with modulation order and SE information at an initial transmission time, and transmits an MCS index mapped with modulation order and CoRe version information at a retransmission time. FIG. 6 below is a case of separately applying an MCS tables for initial transmission and an MCS tables for retransmission using an NPI for distinguishing an initial transmission time and a retransmission time. Unlike this, FIG. 7 below is a case of, without using an NPI for distinguishing an initial transmission time and a retransmission time, applying one MCS table while extending an MCS index to distinguish the initial transmission time and the retransmission time. In FIG. 8 below, the HARQ controller 304 transmits an MCS index mapped with modulation order and SE information at an initial transmission time, and transmits an MCS index mapped with modulation order, SPID, and CoRe version information at a retransmission time. In FIG. 9 below, the HARQ controller 304 transmits an MCS index mapped with modulation order and SE information at an initial transmission time, and compares whether a modulation order is the same as or is different from that of initial transmission at a retransmission time. After the comparison, if the modulation order is the same, the HARQ controller 304 applies MCS indexes of '0' to '7' mapped with SPIDs and CoRe versions. If the modulation order is different, the HARQ controller 304 applies MCS indexes of '8' to '15' mapped with modulation orders and SPIDs.

The message generator 306 receives information from the HARQ controller 304, and generates a HARQ control message. For example, the message generator 306 generates a HARQ MAP message. The OFDM transmitter 308 OFDM-modulates data from the message generator 306 and generates OFDM symbols. Here, the OFDM modulation represents an inclusion of Inverse Fast Fourier Transform (IFFT) operation, CP insertion, and so forth. Additionally, the OFDM transmitter 308 converts the OFDM symbols into an analog signal, converts the baseband signal into an RF signal, and transmits the RF signal through an antenna.

An example of mapping information necessary for retransmission with an MCS index is described with reference to FIGS. 4 to 9 showing MCS tables for initial transmission and retransmission. The determination on whether the MS is subjected to initial transmission or retransmission can be also carried out using an NPI. Alternatively, the initial transmission and retransmission can be also distinguished by an MCS index extended in one MCS table without using an NPI. In an exemplary embodiment of the present invention, because SPID or CoRe version information are not transmitted at an initial transmission time, the SPID or CoRe version information should be always fixed to a specific value at the initial transmission time so that an MS and a BS can be aware of the SPID or CoRe version information.

FIG. 4 illustrates a method for reducing a MAP overhead using an MCS index of 4 bits according to an exemplary embodiment of the present invention, and is an example of transmitting an SPID only at a retransmission time.

Referring to FIG. 4, an MCS table for initial transmission includes modulation order and SE information, and an MCS table for retransmission includes modulation order and SPID information. In the case of transmitting an MCS index mapped with modulation order and SE information in the MCS table for initial transmission, MTI information is set to '1'. In the case of transmitting an MCS index mapped with modulation order and SPID information in the MCS table for retransmission, MTI information is set to '0'.

FIG. 4 is a case of using the MTI information to distinguish the MCS table for initial transmission and the MCS table for retransmission. Unlike this, FIG. 5 is a case of, without using the MTI information, applying one MCS table while extending an MCS index to distinguish an initial transmission time and a retransmission time.

For example, MCS indexes of '0' to '15' are used for initial transmission, and MCS indexes of '16' to '31' are used for retransmission. That is, the MCS indexes of '0' to '15' are mapped with the modulation order and SE information, and the MCS indexes of '16' to '27' are mapped with the modulation order and SPID information. And, the MCS indexes of '28' to '31' are reserved.

FIG. 6 illustrates a method for reducing a MAP overhead using an MCS index of 4 bits according to an exemplary embodiment of the present invention, and is an example of transmitting a CoRe version only at a retransmission time.

Referring to FIG. 6, at an initial transmission time, an MCS index mapped with modulation order and SE information is transmitted and, at a retransmission time, an MCS index mapped with modulation order and CoRe version information is transmitted.

Referring to FIG. 6, an MCS table for initial transmission includes modulation order and SE information, and an MCS table for retransmission includes modulation order and CoRe information. In the case of transmitting an MCS index mapped with modulation order and SE information in the MCS table for initial transmission, MTI information is set to '1'. In the case of transmitting an MCS index mapped with modulation order and CoRe information in the MCS table for retransmission, MTI information is set to '0'.

FIG. 6 is a case of using the MTI information to distinguish the MCS table for initial transmission and the MCS table for retransmission. Unlike this, FIG. 7 illustrates a case of, without using the MTI information, applying one MCS table while extending an MCS index to distinguish an initial transmission time and a retransmission time.

For example, MCS indexes of '0' to '15' are used for initial transmission, and MCS indexes of '16' to '31' are used for retransmission. That is, the MCS indexes of '0' to '15' are mapped with modulation order and SE information, and the MCS indexes of '16' to '24' are mapped with modulation order and CoRe information. Additionally, the MCS indexes of '25' to '31' are reserved.

FIG. 8 illustrates a method for reducing a MAP overhead using an MCS index of 5 bits according to an exemplary embodiment of the present invention, and is an example of transmitting an SPID and a CoRe version only at a retransmission time.

Referring to FIG. 8, an MCS table for initial transmission includes modulation order and SE information, and an MCS table for retransmission includes modulation order, SPID, and CoRe information. In the case of transmitting an MCS index mapped with modulation order and SE information in the MCS table for initial transmission, MTI information is set to '1'. In the case of transmitting an MCS index mapped with modulation order, SPID, and CoRe information in the MCS table for retransmission, MTI information is set to '0'.

FIG. 9 illustrates a method for reducing a MAP overhead using an MCS index of 4 bits according to an exemplary embodiment of the present invention, and is an example of transmitting an SPID and a CoRe version at a retransmission time.

Referring to FIG. 9, in the case of intending to transmit an MCS index of an MCS table for initial transmission, an MTI is set to '1', and an MCS index mapped with modulation order and SE information is transmitted. In the case of intending to transmit an MCS index of an MCS table for retransmission, an MTI is set to '0', and it is compared whether a modulation order is the same as or different from that of initial transmission. After the comparison, if the modulation order is the same, MCS indexes of '0' to '7' mapped with SPIDs and CoRe versions are used. If the modulation order is different, MCS indexes of '8' to '15' mapped with modulation orders and SPIDs are used. This is not to use the CoRe version if the modulation orders of the initial transmission and retransmission are different from each other in a structure of FIG. 9. If a modulation scheme is equal to Quadrature Phase Shift Keying (QPSK) at the initial transmission, it is decided that modulation orders '0' and '1' indicate 16QAM and 64QAM, respectively. If the modulation scheme is equal to 16QAM at the initial transmission, it is decided that the modulation orders '0' and '1' indicate QPSK and 64QAM, respectively. If the modulation scheme is equal to 64QAM at the initial transmission, it is decided that the modulation orders '0' and '1' indicate QPSK and 16QAM, respectively.

In addition to a method using an MCS index, a method for, after allocating a fixed region for a variety of information that should be transmitted, distinguishing an initial transmission time and a retransmission time and transmitting the information is described below.

As a new emerging technology in an IEEE 802.16 communication system, there is the aforementioned CoRe transmission method, a flexible Mother Code Rate (MCR), and so forth. The flexible MCR is a technology necessary for a case in which an MS with a limited buffer has to support a high data throughput. Below, this is called a MCR change technique. To apply the aforementioned technologies, control information should be included in a MAP or CoRe version or changed MCR information should be included in a different region, thus requiring an additional overhead. Because an MCR among the information is needed in determining a Nep as described above, the MCR is information needed only at an initial transmission time. As described above, information needed only at a retransmission time is a CoRe version, an SPID, and the like.

In the case of using a fixed resource region for initial transmission and retransmission, among necessary information, amounts of information needed only at an initial transmission time and information needed only at a retransmission time are compared with each other and then, only the information amount of the same or greater is allocated to a MAP or different region.

And, through the fixed region, the information needed only at the initial transmission time is transmitted at the initial transmission time, and information needed only at the retransmission time is transmitted at the retransmission time.

For example, if two bits are needed for a CoRe version and three bits are needed for an MCR, only three bits are allocated to a MAP or different region such that only the MCR is transmitted at an initial transmission time and the CoRe version is transmitted at a retransmission time.

For another example, if two bits are needed for an SPI, two bits are needed for a CoRe version, and two bits are needed for an MCR, only four bits are allocated to a MAP region such that only the MCR can be transmitted at an initial transmission time and the SPI and CoRe version can be transmitted at a retransmission time.

An example of distinguishing an MCS table for initial transmission and an MCS table for retransmission and using an MCS index in FIGS. 4 to 9 is merely one exemplary embodiment. The MCS index does not intend to limit the scope of the present invention.

As described above, there is an advantage of being capable of reducing a MAP overhead at a retransmission time by mapping information needed at a retransmission time to an MCS index and transmitting the information in a broadband wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Base Station (BS) operation method in a wireless communication system, the method comprising:
    transmitting first control information for initial transmission, the first control information comprising a first Modulation and Coding Scheme (MCS) index indicating a modulation order;
    changing the first MCS index into a second index indicating at least one of a SubPacket Identifier (SPID) and a Constellation Rearrangement (CoRe) when there is a retransmission request; and
    transmitting second control information for retransmission including the second MCS index.

2. The method of claim 1, wherein:
    the first MCS index further indicates Spectral Efficiency (SE) information.

3. The method of claim 1, wherein the second MCS index further indicates the modulation order.

4. The method of claim 1, wherein, in the case of applying separate MCS tables for the initial transmission and the retransmission, the initial transmission and the retransmission are distinguished by an MCS Table Indicator (MTI) or, in the case of applying one MCS table for the initial transmission and the retransmission, the initial transmission and the retransmission are distinguished by an MCS index.

5. The method of claim 1, wherein, if the modulation orders are different at the initial transmission time and the retransmission time, the second MCS index indicates the modulation order and the SPID, and
    wherein, if the modulation orders are the same at the initial transmission time and the retransmission time, the second MCS index indicates the SPID and the CoRe.

6. The method of claim 1, further comprising, when receiving a null signal for the initial transmission, retransmitting the control information for the initial transmission.

7. A Mobile Station (MS) operation method in a wireless communication system, the method comprising:
    acquiring first control information for initial transmission, the first control information comprising a first Modulation and Coding Scheme (MCS) index indicating a modulation order;
    requesting retransmission when there is a need for a retransmission request; and
    acquiring second control information for the retransmission, the second control information comprising a second MCS index indicating at least one of a SubPacket Identifier (SPID) and Constellation Rearrangement (CoRe).

8. The method of claim 7, wherein the first MCS index further indicates Spectral Efficiency (SE) information.

9. The method of claim 7, wherein the second MCS index further indicates the modulation order.

10. The method of claim 7, wherein, in the case of applying separate MCS tables for the initial transmission and the retransmission, the initial transmission and the retransmission are distinguished by an MCS Table Indicator (MTI) or, in the case of applying one MCS table for the initial transmission and the retransmission, the initial transmission and the retransmission are distinguished by an MCS index.

11. The method of claim 7, wherein, if the modulation orders are different at the initial transmission time and the retransmission time, the second MCS index indicates the modulation order and the SPID, and
    wherein, if the modulation orders are the same at the initial transmission time and the retransmission time, the second MCS index indicates the SPID and the CoRe.

12. The method of claim 7, further comprising transmitting a null signal for re-requesting the first control information for the initial transmission.

13. An apparatus capable of reducing an overhead in a wireless communication system, the apparatus comprising:
    a Hybrid Automatic Repeat reQuest (HARQ) controller configured to transmit first control information for initial transmission, the first control information comprising a first Modulation and Coding Scheme (MCS) index indicating a modulation order;
    when there is a retransmission request for the initial transmission, the HARQ controller is configured to change the first MCS index into a second MCS index indicating at least one of a SubPacket Identifier (SPID) and a Constellation Rearrangement (CoRe), and
    to transmit second control information for retransmission comprising the second MCS index.

14. The apparatus of claim 13, wherein the first MCS index further indicates Spectral Efficiency (SE) information.

15. The apparatus of claim 14, wherein the second MCS index further indicates the modulation order.

16. The apparatus of claim 13, wherein, in the case of applying separate MCS tables for the initial transmission and the retransmission, the initial transmission and the retransmission are distinguished by an MCS Table Indicator (MTI) or, in the case of applying one MCS table for the initial transmission and the retransmission, the initial transmission and the retransmission are distinguished by an MCS index.

17. The apparatus of claim 13, wherein, if the modulation orders are different at the initial transmission time and the retransmission time, the second MCS index indicates the modulation order and the SPID, and
    wherein, if the modulation orders are the same at the initial transmission time and the retransmission time, the second MCS index indicates the SPID and the CoRe.

18. The apparatus of claim 13, wherein, when receiving a null signal for the initial transmission, the HARQ controller retransmits the first control information for the initial transmission.

19. An apparatus capable of reducing an overhead in a wireless communication system, the apparatus comprising
    a Hybrid Automatic Repeat reQuest (HARQ) controller configured to:
        acquire first control information for initial transmission, the first control information comprising a first Modulation and Coding Scheme (MCS) indicating a modulation order,
        request retransmission when there is a need for a retransmission request for the initial transmission, and
        acquire second control information for the retransmission, the second control information comprising a second MCS index indicating at least one of a SubPacket Identifier (SPID) and a Constellation Rearrangement (CoRe).

20. The apparatus of claim 19, wherein the first MCS index further indicates Spectral Efficiency (SE) information.

21. The apparatus of claim 19, wherein the second MCS index further indicates the modulation order.

22. The apparatus of claim 19, wherein, in the case of applying separate MCS tables for the initial transmission and the retransmission, the initial transmission and the retransmission are distinguished by an MCS Table Indicator (MTI) or, in the case of applying one MCS table for the initial transmission and the retransmission, the initial transmission and the retransmission are distinguished by an MCS index.

23. The apparatus of claim 19, wherein, if the modulation orders are different at the initial transmission time and the retransmission time, the second MCS index indicates the modulation order and the SPID, and wherein, if the modulation orders are the same at the initial transmission time and the retransmission time, the second MCS index indicates the SPID and the CoRe.

24. The apparatus of claim 19, wherein the HARQ controller transmits a null signal for re-requesting the first control information for the initial transmission.

25. A method in a wireless communication system, the method comprising:

configuring a first information table for initial transmission and a second information table for retransmission;

transmitting a first index in the first information table, at the initial transmission time; and transmitting a second index in the second information table, at the initial transmission time, wherein the first index of the first information table indicates a modulation order and the second index of the second information table indicates at least one of a Sub-Packet Identifier (SPID) and a Constellation Rearrangement (CoRe).

26. The method of claim 25, wherein the first index further indicates Spectral Efficiency (SE) information.

27. The method of claim 25, wherein the second index further indicates the modulation order.

28. The method of claim 25, wherein, in the case of applying separate information tables for the initial transmission and the retransmission, the initial transmission and the retransmission are distinguished by a table indicator or, in the case of applying one information table for the initial transmission and the retransmission, the initial transmission and the retransmission are distinguished by an index.

29. The method of claim 25, wherein, if the modulation orders are different at the initial transmission time and the retransmission time, the second index indicates the modulation order and the SPID, and wherein, if the modulation orders are the same at the initial transmission time and the retransmission time, the second index indicates the SPID and the CoRe.

30. The method of claim 25 further comprising, when receiving a null signal for the initial transmission, retransmitting the first index for the initial transmission.

\* \* \* \* \*